United States Patent [19]

Giles et al.

[11] Patent Number: 4,511,219

[45] Date of Patent: Apr. 16, 1985

[54] KALMAN FILTER PREPROCESSOR

[75] Inventors: Michael K. Giles; Robert B. Rogers, both of Albuquerque, N. Mex.

[73] Assignee: The United States of America as represented by the Secretary of the Air Force, Washington, D.C.

[21] Appl. No.: 388,574

[22] Filed: Jun. 15, 1982

[51] Int. Cl.³ .......................... G02B 27/28; G02F 1/01
[52] U.S. Cl. ..................................... 350/388; 350/403
[58] Field of Search ............. 350/3.68, 162.13, 162.14, 350/388, 403

[56] References Cited

U.S. PATENT DOCUMENTS

| | | | |
|---|---|---|---|
| 3,700,902 | 10/1972 | Buchan | 350/388 |
| 3,882,454 | 5/1975 | Marie et al. | 382/22 |
| 3,888,591 | 6/1975 | Roetling | 356/114 |
| 4,018,509 | 4/1977 | Boswell et al. | 350/342 |
| 4,075,604 | 2/1978 | Degasperi | 340/146.3 |
| 4,124,278 | 11/1978 | Grinberg et al. | 350/342 |
| 4,158,502 | 6/1979 | Greiner et al. | 350/162.13 |
| 4,168,524 | 9/1979 | Soltz et al. | 350/5 |
| 4,357,676 | 11/1982 | Brown | 350/162.13 |

*Primary Examiner*—John K. Corbin
*Assistant Examiner*—Lynn Vandenburgh Kent
*Attorney, Agent, or Firm*—Donald J. Singer; Bernard E. Franz

[57] ABSTRACT

An optical signal preprocessor for computing the input functions required to utilize an extended Kalman filter algorithm. An incoming stream of time-varying images is integrated to form a reference image, which is then subtracted from each subsequently sampled image. The result is digitized for use with the extended Kalman filter algorithm. The reference image is also fed through a spatial filter and then input to two light valve image subtraction systems to produce difference image approximations of two partial derivatives. These derivative functions are then digitized and utilized as inputs to the extended Kalman filter algorithm.

11 Claims, 2 Drawing Figures

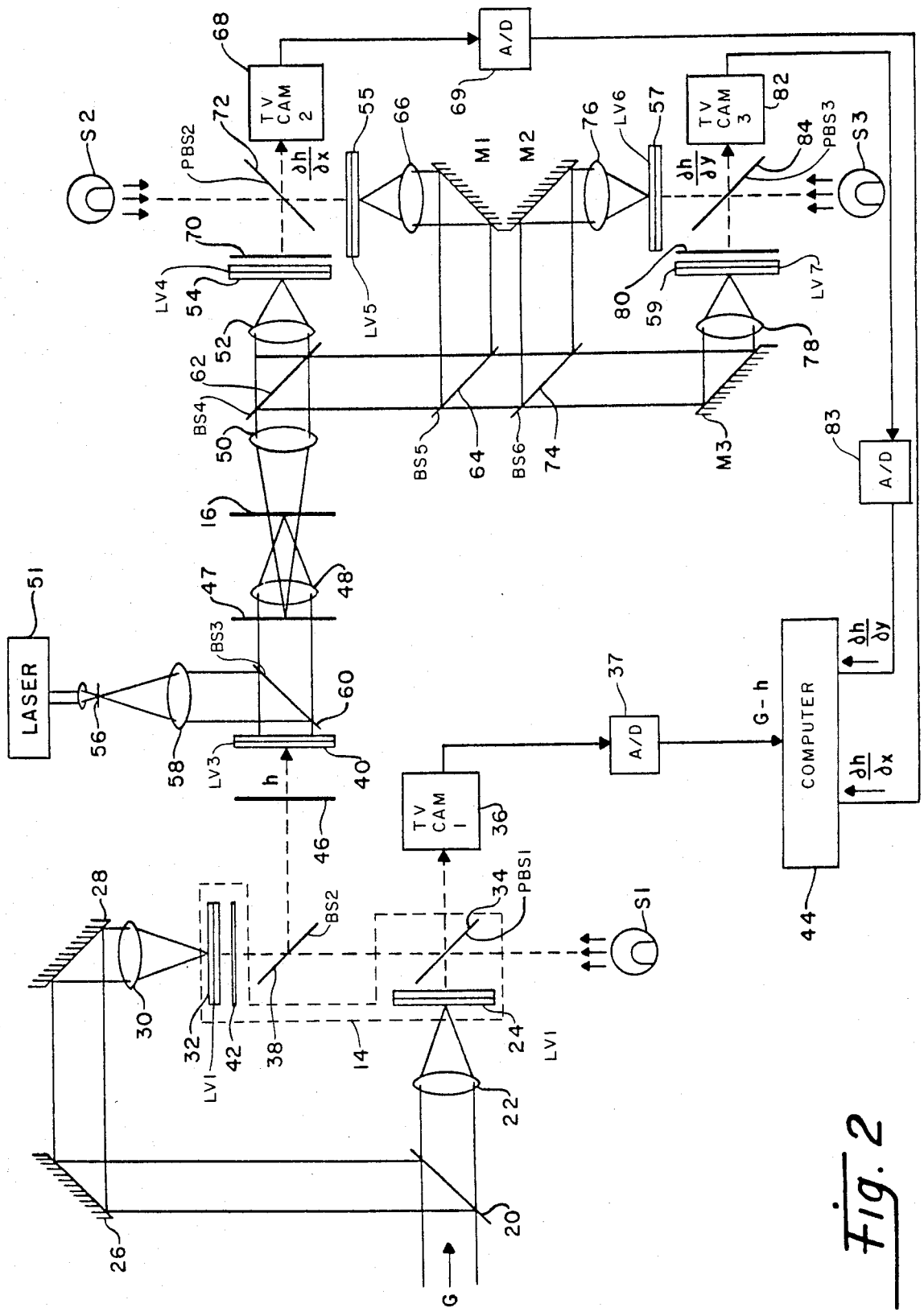

4,511,219

KALMAN FILTER PREPROCESSOR

RIGHTS OF THE GOVERNMENT

The invention described herein may be manufactured and used by or for the Government of the United States for all governmental purposes without the payment of any royalty.

BACKGROUND OF THE INVENTION

The field of the invention relates to an image processing system in general, and in particular to an apparatus for providing optical differentiation between two images to be used as inputs for a Kalman filter algorithm.

An extended Kalman filter algorithm is a computerized technique developed in the general area of estimation theory for nonlinear systems. The algorithm is a sophisticated technique of performing an error analysis on real time measurements and making corresponding corrections to a system state. Typically, the Kalman filter algorithm is used with space navigation systems and usually involves the use of a covariance matrix and weighting coefficients. For more information about Kalman filter algorithms, see *The Kalman Filter: Its Recognition and Development for Aerospace Applications* American Institute of Aeronautics and Astronautics, Inc., Journal of Guidance and Control, Jan.-Feb. 1981, pg. 4. Also see *Least-squares estimation: from Gauss to Kalman,* IEEE Spectrum, Jul. 1970, pg 63. Another good reference is *An Adaptive Extended Kalman Filter for Target Image Tracking,* IEEE Transactions on Aerospace and Electronic Systems, Vol. AES-17, No. 2, Mar. 1981, pg 173.

At the present time, computer usage of the extended Kalman filter algorithm requires the calculation of three preliminary functions in order to be able to utilize the algorithm with data that is collected optically. Presently, these three functions are calculated digitally by the same computer used to execute the extended Kalman filter algorithm. Unfortunately, the computation of these functions by digital computers at video rates requires prohibitively high data rates for images larger than $8 \times 8$ pixels. Consequently, the digital computer is unable to efficiently perform lower data rate tasks required by the Kalman filter algorithm such as matrix manipulations and multiplications.

U.S. Pat. No. 3 888,591 discloses a system for subtracting two images utilizing encoding and filtering means. U.S. Pat. No. 4,075,604 teaches an apparatus having sampling means for real time recognition of test images by comparison with sample images. While both patents are useful devices for their intended purposes, they are unsuitable for providing the three parameters needed in executing an extended Kalman filter algorithm.

SUMMARY OF THE INVENTION

It is an object of the invention to provide a device that computes optically the input functions required by the extended Kalman filter thereby increasing the digital computer's efficiency for images larger than $8 \times 8$ pixels.

According to the invention, an incoming stream of time varying images, G, is integrated to form a reference image, h, which is then input to two light valve image subtraction systems to produce difference image approximations to the partial derivatives $\partial h/\partial x$ and $\partial h/\partial y$; additionally the reference image h is then subtracted from each subsequent sampled image G. The result, $G-h$, is digitized and used as an input to an extended Kalman filter algorithm. The two partial derivatives are likewise digitized and inputted into the algorithm.

BRIEF DESCRIPTION OF THE DRAWINGS

FIG. 2 is a schematic diagram of the optical elements comprising the preferred embodiment of the invention.

DETAILED DESCRIPTION OF THE INVENTION

Figure 1:
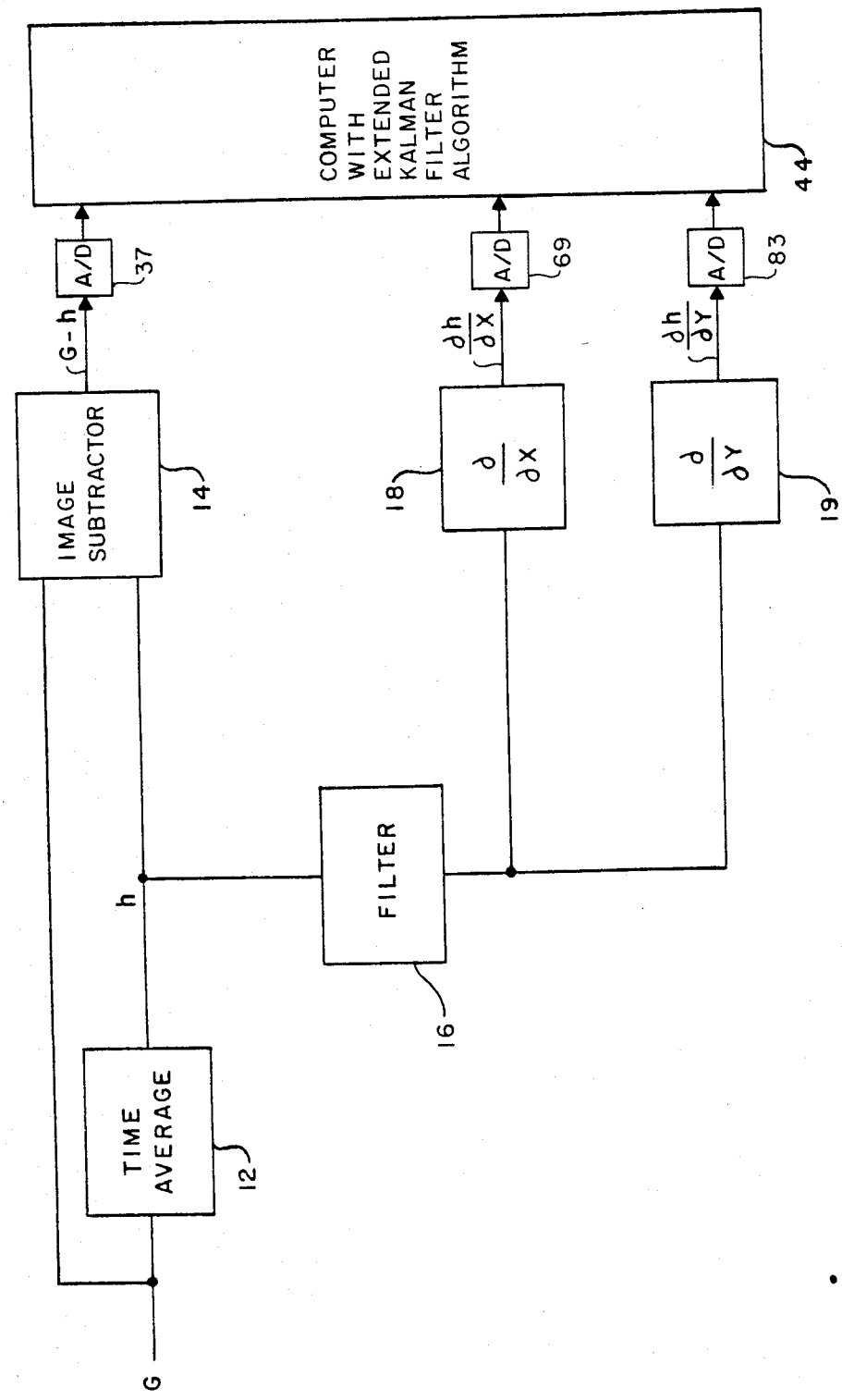
FIG. 1 is a block diagram of the invention according to the preferred embodiment.

Referring to FIG. 1, a source of input images G, typically non-coherent telescope or television camera images, is fed into an integrator 12 for computing a time averaged signal h over several input frames. Source image G and averaged signal h are fed into an image subtractor 14 for subtracting the averaged image h point by point from the input image G to produce the desired two-dimensional difference function $G-h$. The averaged image h is additionally fed through a spatial filter 16 for noise reduction and then split into two separate paths. Each path passes the image into separate but parallel differentiators 18 and 19. One differentiator performs spatial differentiation on the image with respect to one dimension (i.e. the x direction), while the second differentiator likewise performs spatial differentiation on the image but with respect to the opposite dimension (i.e. the y direction). The resultant functions are known as $\partial h/\partial x$ and $\partial h/\partial y$ respectively. All three functions, $G-h$, $\partial h/\partial x$, and $\partial h/\partial y$, are coupled through an analog-to-digital converter to a computer 44 where they are utilized by the Kalman filter algorithm.

Referring to FIG. 2, a source of input images G is transitioned to a beam-splitter 20 for dividing G into two beams. One beam passes through a lens 22 for focusing the beam on a light valve 24. The other beam is transitioned via mirrors 26, 28 and lens 30 and is focused on a light valve 32 simultaneously with the beam striking light valve 24.

A light valve is a device in which the light transmission can be varied in accordance with an externally applied electrical signal. Such a light valve typically has a fiber optic face plate at the input surface, followed by a photoconductive layer, followed by a layer of an electro-optic material (typically a liquid crystal), and ending with a second transparent electrode on the output surface. Operationally, an incident intensity image is presented at the input side of the light valve and is transitioned via the fiber optic face plate and transparent electrode to the photoconductive layer. A voltage is placed across the input and output transparent electrodes which gives rise to an electric field across the entire device. The layer of electro-optic material, whose birefringence varies as the electric field across it varies, responds to produce an output image which is transitioned to the output electrode. Additional layers of index matching dielectric material are introduced by some manufacturers between the photoconductive and electro-optic layers to isolate the input and output light beams and to allow reflective readout through the output transparent electrode. The spatially varying irradiance of the input image gives raise to spatially varying conductivity across the photoconductive layer which in turn gives rise to a spatially varying electric field across the output electro-optic material. The birefringence of the output electro-optic layer thus varies spatially with the spatially varying electric field, and the polarization of a linearly polarized readout beam (coherent or incoherent) will exhibit a spatially varying polarization as it leaves the output surface of the light valve. If the output beam passes through a linear polarized oriented orthogonally to the original polarization of the readout beam, a positive output intensity image will be produced. If the output beam passes through a parallel linear polarizer, a negative output intensity image will be produced.

An input image G is presented simultaneously at light valves 32 and 24. Light valve 32 continuously integrates the input image producing a continuous reference image h, which consists of the time integral of the previous 100–200 ms of input data. This integration time is somewhat longer than the integration time of typical liquid crystal light valves and is controlled by the input image irradiance and the bias voltage. An incoherent light source S1 is situated such that its light beam is pointed directly at the output side of the light valve 32. Light valve 24 is positioned such that a line drawn perpendicular from the output surface of the valve is perpendicular to the light path from source S1 to valve 32. A polarized beamsplitter 34 is placed at the intersection of the light path from source S1 and the perpendicular line from valve 24 such that it will reflect the light from source S1 onto the output surface of light valve 24. This beamsplitter causes the reflected light to become polarized and also polarizes the light which passes through it. The light is then reflected from the output side of the light valve back through the polarizing beamsplitter 34 and onto a TV camera 36 lens. The character of the light reflected from the output side of the light valve is controlled by the image focused on the input side of the light valve.

Similarly, another polarizing beamsplitter 38 is placed in the light path from source S1, between light valve 32 and beamsplitter 34, such that it will reflect the light from the output side of light valve 32 by 90° thereby sending it to a third light valve 40. A λ/4 retarder 42 is introduced between light valves 32 and beamsplitter 38 to provide an additional 90° of rotation of the polarization of the reflected readout beam at valve 32 (The retarder 42 is traversed twice by the readout beam.), so that the image h is effectively read out between parallel polarizers, thus producing a negative image h at the output of the polarizing beam-splitter 34. The images G and −h are combined at a 30–60 Hz rate to form G−h at the input to the TV camera. Similarly, a positive image h is produced at the output of beamsplitter 38 and is sent to light valve 40.

The combination of valves 24 and 32, light source S1, polarizing beamsplitter 34, and the λ/4 retarder comprise the image subtraction system 14 of FIG. 1.

The output of TV camera 36 is a video signal which is coupled through an analog-to-digital converter and sent to digital computer 44 to be used in the extended Kalman filter algorithm.

Light valve 40 serves as an input to a coherent optical spatial filtering system. The reference image h is the input to the spatial filter. An analyzer 46 is installed just prior to light valve 40 for changing the polarization pattern back to an image amplitude pattern. The output side of light valve 40 faces a series of lenses 48, 50, and 52 oriented in a straight line to accept and transition an image appearing on the output side of the light valve. A laser 51 with its beam passing through a pinhole 56 and lens 58 is positioned with its beam oriented parallel with the output surface of light valve 40 and perpendicular to the light path passing between valve 40 and lens 48. A beamsplitter 60 is inserted into this light path such that the beam from the laser is reflected onto the output surface of valve 40 to readout the image h with the reflected light which then traverses beamsplitter 60 and is transitioned through lenses 48, 50 and 52 to appear on the input side of another light valve 54. An analyzer 47 is installed at the focal point of lens 50 for converting the polarization pattern to an image amplitude pattern while a spatial filter 16 is installed at the focal point of lens 48 for filtering and noise reduction purposes.

The output filtered version of reference image h is presented simultaneously at four light valves: 54, 55, 57 and 60. These four light valves comprise two optical subtraction systems equivalent to the system described above which use light valves 24 and 32. Light valves 54 and 55 comprise one subtraction system and valves 57 and 60 comprise the second.

The simultaneous presentation of reference image h at the two light valves 54 and 55, which are oriented at right angles to each other, is accomplished by splitting the light beam between lenses 50 and 52 using a beamsplitter 62. Another beamsplitter 64 is introduced within the reflected beam produced by beamsplitter 62, thus splitting the beam again and sending a new reflected beam into a mirror M1 which in turn reflects the beam through a lens 66 for focusing the reference image h onto the input side of light valve 55. A λ/4 retarder 70 is inserted just in front of the output side of valve 54 to provide a 90° rotation of the polarization of the beam used for reflective readout of the image h as it appears on the output side of valve 54. An incoherent light source S2 is positioned directly in line with the output side of valve 55, and a TV camera 68 is positioned directly in line with the output side of valve 54 such that the light path from the camera to valve 54 intersects with and is orthogonal to the light path from source S2 to valve 55. A polarizing beamsplitter 72 is inserted at the intersection of the light paths such that light from source S2 passes through to valve 55 and is also reflected to valve 54 via retarder 70. Thus, image h appearing on the output side of valve 55 is reflected via polarizing beamsplitter 72 into camera 68 while output image h from the output side of valve 54 passes through retarder 70 and polarizing beamsplitter 72 and appears at camera 68 as a negative image. Operationally, mirror M1 is tilted slightly about the y-axis to introduce a slight offset in the x direction. Thus the image h is subtracted from an x-shifted version of h to produce a good approximation of the desired partial derivative, $\partial h/\partial x$. TV camera 68 converts the resultant image into a video analog signal which is coupled through an analog-to-digital converter and made available for use in computer 44.

The simultaneous presentation of reference image h at light valves 56 and 60, which are oriented at right angles to each other, is accomplished by dividing the light beam that passes through beamsplitter 64 into two separate beams using a beamsplitter 74. Each of these two separate beams is reflected by a mirror; mirror M2 reflects one of the beams through lens 76 onto the input side of light valve 56 while mirror M3 reflects the other beam through lens 78 onto the input side of light valve 60. A λ/4 retarder 80 is inserted just in front of the output side of valve 68 to provide a 90° rotation of the polarization of the beam used for reflective readout of the image h as it appears on the output side of valve 68. An incoherent light source S3 is positioned directly in line with the output side of valve 56, and a TV camera 82 is positioned directly in line with the output side of valve 60 such that the light path from the camera to valve 60 intersects with and is orthogonal to the light path from source S3 to valve 57. A polarizing beamsplitter 84 is inserted at the intersection of the light paths such that light from source S3 passes through to valve 57 and is also reflected to valve 60 via retarder 80. Thus, image h appearing on the output side of valve 57 will be reflected via polarizing beamsplitter 84 into camera 82 while output image h from the output side of 60 passes through retarder 80 and polarizing beamsplitter 84 and appears at camera 82 as a negative image. Operationally, mirror M2 is tilted slightly about the x-axis to introduce a slight offset in the y direction. Thus, the image h is subtracted from a y-shifted version of h to produce a good approximation of the desired partial derivative, $\partial h/\partial y$. TV camera 82 converts the resultant image into a video analog signal which is coupled through an analog-to-digital converter and made available for use in computer 44.

In summary, the functions G−h, $\partial h/\partial x$, and $\partial h/\partial y$ are produced by the optical system presented schematically in FIG. 2. These functions are in the form of two-dimensional images which are input to TV cameras and then converted to digital signals and fed to a computer as inputs to the Kalman filter algorithm.

Thus, while preferred constructional features of the invention are embodied in the structure illustrated herein, it is to be understood that changes and variations may be made by the skilled in the art without departing from the spirit and scope of the invention.

We claim:

1. An optical signal preprocessing apparatus for use with a computer employing an extended Kalman filter algorithm, said apparatus comprising:
    time averaging means for operating on a source of time varying images to compose an average reference time signal;
    subtraction means for subtracting said reference image signal from said source of images, on a continuous basis, to produce a resultant subtraction function image,
    first differentiating means for producing a first difference image approximation of a first numbered partial derivative of said reference image signal with respect to a first image dimension,
    second differentiating means for producing a second difference image approximation of a second numbered partial derivative of said reference image signal with respect to a second image dimension;
    first, second and third optical to electrical signal transducer means for converting said resultant subtraction function image, and said first and second difference image approximations into electrical signals for use with said computer.

2. The apparatus according to claim 1, further including a spatial filtering means operating on said reference image signal for reducing image noise prior to said reference image signal being operated on by either said differentiating means.

3. The apparatus of claim 2, wherein said time averaging means includes means for splitting off a portion of the source of time varying images and guiding this beam through a time intergrating light valve which has an input image irradiance and a bias voltage selected to perform such an integration.

4. The apparatus of claim 3, wherein said subtraction means includes
    first beamsplitter means for generating a first pair of component images from an input image;
    first and second light valves having input surfaces respectively receiving said first pair component images and liquid crystal output surfaces illuminated by a first light source; and
    first polarizing beamsplitter means located intermediate said first light source and said first and second light valves for transmitting and reflecting light in communication with said first light source, said first and second light valve output surfaces and a first optical to electrical transducer element.

5. The apparatus of claim 4, wherein said differentiating means includes
    fourth and fifth beamsplitter means for generating a second pair of component images from a differentiation input image;
    fourth and fifth light valves having input surfaces respectively receiving said second pair component images and liquid crystal output surfaces illuminated by a second light source; and
    second polarizing beamsplitter means located intermediate said second light source and said fourth and fifth light valves for transmitting and reflecting light in communication with said second light source, said fourth and fifth light valve output surfaces and a second optical to electrical transducer element.

6. The apparatus of claim 5, wherein said second differentiating means includes
    sixth beamsplitter means for generating a third pair of component images from a differentiation input image;
    sixth and seventh light valves having input surfaces respectively receiving said third pair component images and liquid crystal output surfaces illuminated by a third light source; and
    third polarizing beamsplitter means located intermediate said third light source and said sixth and seventh light valves for transmitting and reflecting light in communication with said third light source, said sixth and seventh light valve output surfaces, and a third optical to electrical transducer element.

7. The apparatus according to claim 1 or 4 or 6, wherein said subtraction means includes a beamsplitter for splitting off a portion of said source of time varying images via a set of mirrors and a lens and onto a time integrating light valve while simultaneously allowing a portion of said source to pass through said beamsplitter and through a lens and onto a fast response light valve, oriented orthogonally to said time integrating light valve; an incoherent light source positioned such that its beam strikes said time integrating light valve's output side via a λ/4 retarder positioned immediately in front of said valve; a second beamsplitter positioned in the beam from said light source and immediately in front of said λ/4 retarder such that light passing through it strikes said time integrating light valve's output side via said $\partial/4$ retarder and light from said time integrating light valve's output side is reflected in direction of a third light valve and also passes through said second beamsplitter in direction of said light source; a first polarizing beamsplitter positioned in the beam from said light source to said time integrating light valve such that a polarized position of the beam is reflected onto said fast response light valve's output side and a polarized portion passing through said polarized beamsplitter continues on to said time integrating light valve via the second beamsplitter, and light from said fast response light valve's output side passes through said polarized beamsplitter in direction of a first optical-to-electrical transducer, and light passing through said second beamsplitter in direction of said light source is reflected by said polarized beamsplitter also in direction of said first optical-to-electrical transducer.

8. The apparatus of claim 7, wherein said spatial filtering means includes a third light valve, with a first analyzer immediately in front of the valve's input side, oriented to receive the beam from said second beamsplitter; a laser with a beam which passes through a pinhole and lens to a third beamsplitter which is positioned so as to reflect the laser beam onto said third light valve's output side and so that light from said output side passes through said third beamsplitter, through a second analyzer, through a lens, through a spatial filter, and through a set of two additional lenses to a fourth light valve's input side.

9. The apparatus of claim 8, wherein said first numbered differentiating means includes a fourth beamsplitter positioned within said set of two additional filters for splitting off a portion of said beam, reflecting the split off portion via a fifth beamsplitter and via a movable mirror, through a lens and onto a fifth light valve's input side, oriented orthogonally to said fourth light valve, while simultaneously allowing a portion of said beam to pass through said fourth beamsplitter, through a lens, and onto said fourth light valve's input side; a second light source positioned such that its beam strikes said fifth light valve's output side; a second polarizing beamsplitter positioned in the beam from said light source is reflected onto said fourth light valve's output side via a λ/4 retarder placed immediately in front of said valve's output side, and light from said valve's output side passes through said second polarizing beamsplitter in direction of a second optical-to-electric transducer, and light from said fifth light valve's output side is reflected by said second polarizing beamsplitter in direction of said second optical-to-electrical transducer; said movable mirror being tilted slightly in one dimension to produce a difference image approximation of a partial derivative of said beam with respect to said one dimension.

10. The apparatus of claim 9, wherein said second numbered differentiating means includes a portion of said beam passing through said fifth beamsplitter and reaching a sixth beamsplitter so as to produce a reflected beam and a pass through beam, said reflected beam again being reflected by a second movable mirror and through a lens to a sixth light valve's input side, said pass through beam being reflected by a third mirror and through a lens to a seventh light valve's input side, oriented orthogonally to said sixth light valve; a third incoherent light source positioned such that its beam strikes said sixth light valve's output side; a third polarizing beamsplitter positioned in the beam from said light source such that light from said third light source is reflected onto said seventh light valve's output side via a λ/4 retarder placed immediately in front of said valve's output side, and light from said valve's output side passes through said third polarizing beamsplitter in direction of a third optical-to-electrical transducer, and light from said sixth light valve's output side is reflected by said third polarizing beamsplitter in direction of said third optical-to-electrical transducer; said second movable mirror being tilted slightly in a second dimension to produce a difference image approximation of a partial derivative of said beam with respect to said second dimension.

11. The apparatus of claim 10, wherein said first, second, and third optical-to-electrical transducers include television cameras.

* * * * *

UNITED STATES PATENT AND TRADEMARK OFFICE
CERTIFICATE OF CORRECTION

PATENT NO. : 4,511,219

DATED : April 16, 1985

INVENTOR(S) : Michael K. Giles et al

It is certified that error appears in the above-identified patent and that said Letters Patent is hereby corrected as shown below:

At column 4, line 64, change "56" to --- 57 ---.

At column 4, line 66, change "60" to --- 59 ---.

At column 4, line 67, change "68" to --- 59 ---.

At column 5, line 1, change "68" to --- 59 ---.

At column 5, line 3, change "56" to --- 57 ---.

At column 5, line 5, change "60" to --- 59 ---.

At column 5, line 6, change "60" to --- 59 ---.

At column 5, line 10, change "60" to --- 59 ---.

At column 5, line 22, following "converter" insert --- 83 ---.

At column 6, line 63, change "$\partial/4$" to --- $\lambda/4$ ---

UNITED STATES PATENT AND TRADEMARK OFFICE
CERTIFICATE OF CORRECTION

PATENT NO.   : 4,511,219

DATED        : April 16, 1985

INVENTOR(S)  : Michael K. Giles et al

It is certified that error appears in the above-identified patent and that said Letters Patent is hereby corrected as shown below:

At column 2, line 34, delete the word "an".

At column 2, line 34, replace "converter" with the text --- converters 37, 69, and 83 ---.

At column 3, line 7, change "polarized" to --- polarizer ---.

At column 3, line 33, change "onto" to --- into ---.

At column 3, line 33, delete the word "lens".

At column 3, line 57, following "converter" insert --- 37 ---.

At column 4, line 16, change "60" to --- 59 ---.

At column 4, line 20, change "60" to --- 59 ---.

At column 4, line 58, change "56 and 60" to --- 57 and 59 ---.

Signed and Sealed this

Fifteenth Day of October 1985

[SEAL]

Attest:

Attesting Officer

DONALD J. QUIGG

Commissioner of Patents and Trademarks—Designate